US011109249B2

(12) United States Patent
Campbell, Jr. et al.

(10) Patent No.: US 11,109,249 B2
(45) Date of Patent: Aug. 31, 2021

(54) SYSTEMS AND METHODS FOR IMPROVED MONITORING OF A VEHICLE INTEGRATION PLATFORM

(71) Applicant: Uber Technologies, Inc., San Francisco, CA (US)

(72) Inventors: John T. Campbell, Jr., Pittsburgh, PA (US); Matthew James Way, Pittsburgh, PA (US); Brent Justin Goldman, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 114 days.

(21) Appl. No.: 16/454,624

(22) Filed: Jun. 27, 2019

(65) Prior Publication Data
US 2020/0344622 A1 Oct. 29, 2020

Related U.S. Application Data

(60) Provisional application No. 62/839,127, filed on Apr. 26, 2019.

(51) Int. Cl.
*H04W 24/06* (2009.01)
*H04L 12/26* (2006.01)
*H04W 4/40* (2018.01)

(52) U.S. Cl.
CPC ........... *H04W 24/06* (2013.01); *H04L 43/065* (2013.01); *H04L 43/0805* (2013.01); *H04L 43/0823* (2013.01); *H04W 4/40* (2018.02)

(58) Field of Classification Search
CPC ....... H04W 24/06; H04W 4/40; H04W 4/029; H04W 4/80; H04W 4/024; H04L 43/065; H04L 43/0823; H04L 43/0805
See application file for complete search history.

(56) References Cited

U.S. PATENT DOCUMENTS

| 8,433,461 | B2* | 4/2013 | Daum ................. B61L 27/0016 701/19 |
| 10,181,912 | B1* | 1/2019 | Callaghan ........... H04L 43/0876 |
| 10,789,835 | B2* | 9/2020 | Kislovskiy ....... G08G 1/096816 |
| 2004/0066921 | A1* | 4/2004 | Gawande ............. H04Q 3/0091 379/112.1 |
| 2011/0224898 | A1* | 9/2011 | Scofield ................. G08G 1/052 701/532 |
| 2012/0076016 | A1* | 3/2012 | Robbins ................. H04L 43/50 370/252 |
| 2018/0062973 | A1* | 3/2018 | Tran ........................ H04L 43/16 |

(Continued)

*Primary Examiner* — Ivan O Latorre
(74) *Attorney, Agent, or Firm* — Dority & Manning, P.A.

(57) ABSTRACT

Example aspects of the present disclosure are directed to systems and methods that generate simulated communications traffic to enable improved monitoring of the performance of a vehicle integration platform (VIP) associated with a service provider entity. For instance, the VIP can provide services to or otherwise communicate with a number of different clients (e.g., autonomous vehicles included in one or more fleets of autonomous vehicles). However, when, for various operational reasons, the one or more fleets of autonomous vehicle are not operating or otherwise communicating with the VIP, it can be difficult to assess whether the VIP is correctly operating. As such, according to an aspect of the present disclosure, a watchdog monitoring system can be included in or otherwise interoperate with the VIP.

20 Claims, 6 Drawing Sheets

(56) References Cited

U.S. PATENT DOCUMENTS

| | | | | |
|---|---|---|---|---|
| 2018/0257683 A1* | 9/2018 | Govindappa | ....... | B61L 27/0077 |
| 2019/0141549 A1* | 5/2019 | Ganapathi | ............... | G06F 30/00 |
| 2019/0176862 A1* | 6/2019 | Kumar | ............... | G06K 9/00651 |
| 2019/0230525 A1* | 7/2019 | Carreira | ................. | H04W 4/40 |
| 2019/0289474 A1* | 9/2019 | Ozaki | ................. | H04W 64/006 |
| 2020/0027354 A1* | 1/2020 | Goldman | ............... | G07C 5/008 |
| 2020/0302196 A1* | 9/2020 | Wellington | ........ | G06K 9/00825 |
| 2020/0387833 A1* | 12/2020 | Kursun | ............... | H04L 63/1425 |

\* cited by examiner

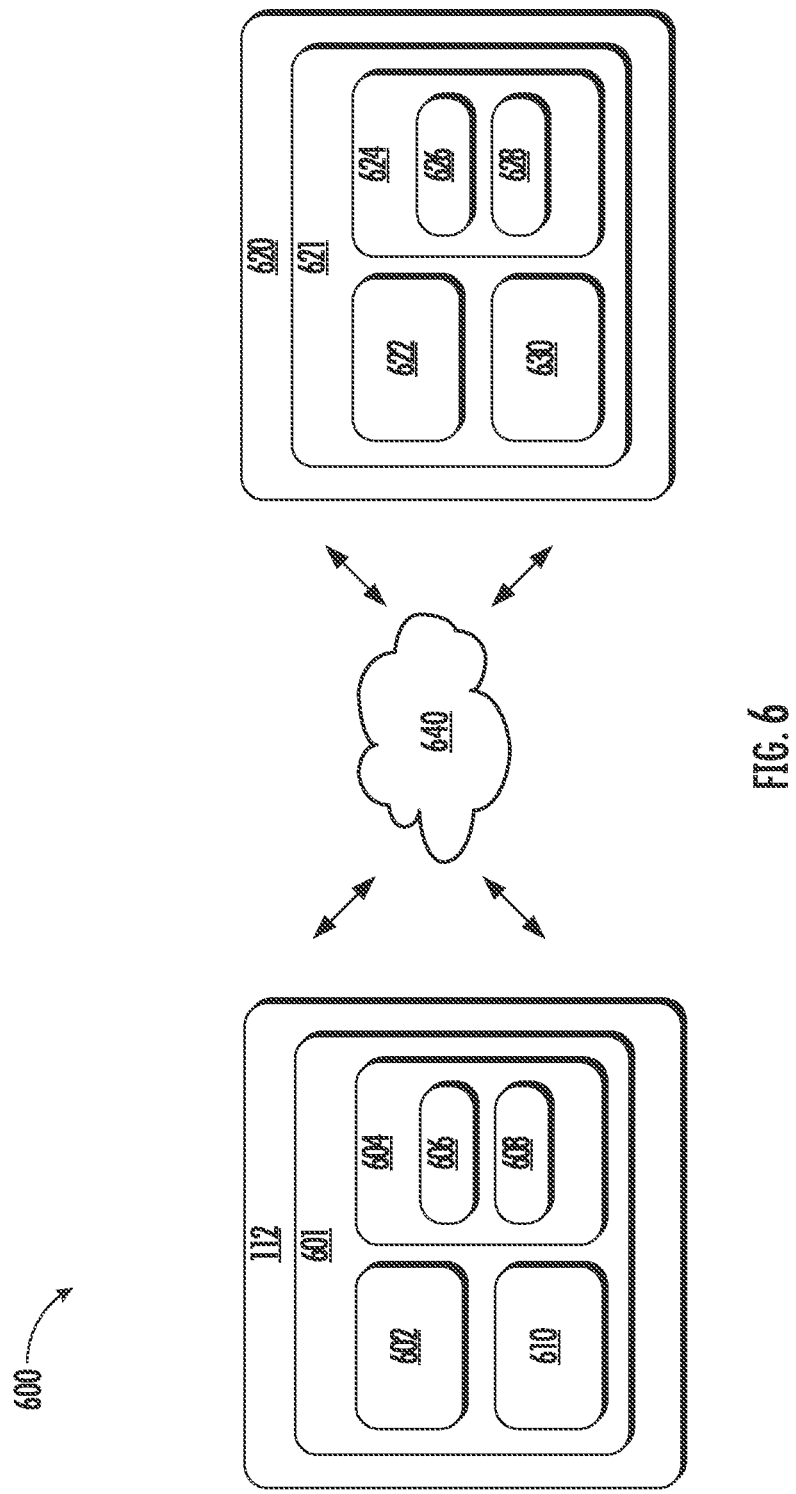

SYSTEMS AND METHODS FOR IMPROVED MONITORING OF A VEHICLE INTEGRATION PLATFORM

RELATED APPLICATIONS

This application claims priority to and the benefit of U.S. Provisional Patent Application No. 62/839,127, filed Apr. 26, 2019, which is hereby incorporated by reference in its entirety.

FIELD

The present disclosure relates generally to systems and methods for improved communications platform monitoring. More particularly, the present disclosure relates to systems and methods that generate simulated communications traffic to enable improved monitoring of the performance of a vehicle integration platform (VIP) associated with a service provider entity.

BACKGROUND

Certain computer-implemented systems or platforms can communicate (e.g., via various network connections) with a number of other computing devices or systems, which may be referred to as "clients" of the system or platform. For example, the system or platform can engage in the communications to provide certain services such as provisioning of information to the clients.

It may be desirable to monitor the performance (e.g., availability, capacity, accuracy, and/or the like) of the system or platform (e.g., in relation to the provisioning of services and/or information to the clients). However, if clients of the system are not currently operational and/or otherwise engaging in communications with the system or platform, it can be difficult to appropriately measure or otherwise monitor the performance of the system or platform.

SUMMARY

Aspects and advantages of embodiments of the present disclosure will be set forth in part in the following description, or can be learned from the description, or can be learned through practice of the embodiments.

One example aspect of the present disclosure is directed to computer-implemented method. The method includes determining, by a computing system comprising one or more computing devices, a first level of communications traffic, wherein the first level of communications traffic is indicative of an amount of actual communications traffic occurring via a vehicle integration platform, wherein the vehicle integration platform comprises a plurality of application programming interfaces configured to facilitate message communication among clients. The method includes determining, by the computing system, a predetermined minimum level of desired communications traffic occurring via the vehicle integration platform, wherein the predetermined minimum level of desired communications traffic is representative of a level at which performance measures of the vehicle integration platform are evaluated. The method includes generating, by the computing system, a second level of communications traffic, wherein the second level of communications traffic comprises an amount of simulated communications traffic determined such that the second level of communications traffic plus the first level of communications traffic is greater than or equal to the predetermined minimum level of desired communications traffic occurring via the vehicle integration platform. The method includes monitoring, by the computing system, one or more performance characteristics of the vehicle integration platform while at least the second level of communications traffic is occurring via the vehicle integration platform.

Another example aspect of the present disclosure is directed to a computing system. The computing system includes one or more processors and one or more memories including instructions that, when executed by the one or more processors, cause the one or more processors to perform operations. The operations include determining a first level of communications traffic, wherein the first level of communications traffic is indicative of an amount of actual communications traffic occurring via a vehicle integration platform, wherein the vehicle integration platform comprises a plurality of application programming interfaces configured to facilitate message communication among clients. The operations include determining a predetermined minimum level of desired communications traffic occurring via the vehicle integration platform, wherein the predetermined minimum level of desired communications traffic is representative of a level at which performance measures of the vehicle integration platform are evaluated. The operations include generating a second level of communications traffic, wherein the second level of communications traffic comprises an amount of simulated communications traffic determined such that the second level of communications traffic plus the first level of communications traffic is greater than or equal to the predetermined minimum level of desired communications traffic occurring via the vehicle integration platform. The operations include monitoring one or more performance characteristics of the vehicle integration platform while at least the second level of communications traffic is occurring via the vehicle integration platform. The operations include publishing one or more of the amount of simulated communications traffic corresponding to the second level of communications traffic and the one or more performance characteristics to a source accessible by one or more of the clients of the vehicle integration platform.

Another example aspect of the present disclosure is directed to a communication infrastructure. The communication infrastructure includes a vehicle integration platform comprising a plurality of application programming interfaces configured to facilitate message communication among clients, the clients comprising at least one third-party client associated with a fleet of autonomous vehicles and at least one first-party client associated with a service provider entity. The communication infrastructure includes a monitoring system configured to: determine a first level of communications traffic, wherein the first level of communications traffic is indicative of an amount of actual communications traffic occurring via a vehicle integration platform; determine a predetermined minimum level of desired communications traffic occurring via the vehicle integration platform, wherein the predetermined minimum level of desired communications traffic is representative of a level at which performance measures of the vehicle integration platform are evaluated; generate a second level of communications traffic, wherein the second level of communications traffic comprises an amount of simulated communications traffic determined such that the second level of communications traffic plus the first level of communications traffic is greater than or equal to the predetermined minimum level of desired communications traffic occurring via the vehicle integration platform; and monitor one or more performance characteristics of the vehicle integration platform while at least the second level of communications traffic is occurring via the vehicle integration platform.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a block diagram of an example computing system according to example embodiments of the present disclosure.

DETAILED DESCRIPTION

Figure 1:
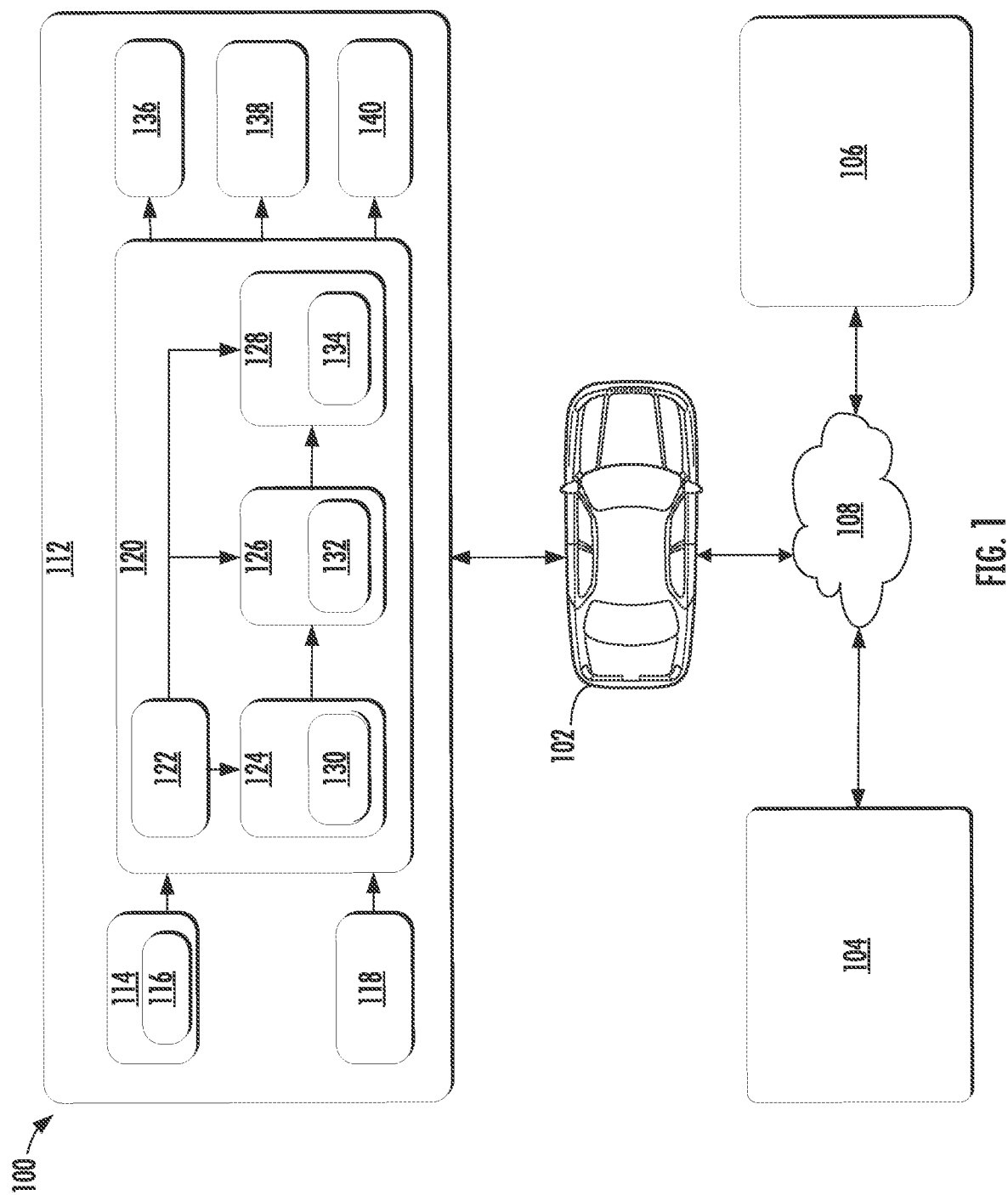
FIG. 1 depicts a block diagram of an example system for controlling the navigation of an autonomous vehicle according to example embodiments of the present disclosure.

Example aspects of the present disclosure are directed to systems and methods that generate simulated communications traffic to enable improved monitoring of the performance of a vehicle integration platform (VIP) associated with a service provider entity. For instance, the VIP can provide services to or otherwise communicate with a number of different clients (e.g., autonomous vehicles included in one or more fleets of autonomous vehicles). However, when, for various operational reasons, the one or more fleets of autonomous vehicle are not operating or otherwise communicating with the VIP, it can be difficult to assess whether the VIP is correctly operating. As such, according to an aspect of the present disclosure, a watchdog monitoring system can be included in or otherwise interoperate with the VIP. In particular, the watchdog monitoring system can monitor actual communications traffic occurring via the VIP and can supplement, if necessary, the actual communications traffic with simulated vehicle communications traffic (e.g., which may be indistinguishable from actual vehicle communications traffic from the perspective of the VIP), so as to maintain at least a minimum level of communications traffic occurring via the VIP at any given time. In such fashion, the performance of the VIP can be more precisely monitored. In particular, use of the watchdog system can reduce the number of false positives in which the VIP is incorrectly assumed to be non-operational due to the lack of communications traffic, when in fact the lack of traffic is attributable to lack of client activity (e.g., fleets of vehicles being offline). Further, whereas certain true negative outages of the VIP may have gone undetected due to lack of client activity, the watchdog system can increase detection of such true negatives by maintaining the level of minimum communications to test VIP available at all times. Thus, communication conducted by both simulated and actual vehicle communications traffic can be monitored and analyzed to maintain oversight over VIP performance.

More particularly, a vehicle integration platform (VIP) can be hosted and managed by a service provider entity. The VIP can include, for example, a plurality of application programming interfaces configured to facilitate message communication among clients. Third-party clients of a VIP can include autonomous vehicles associated with one or more respective vendors and/or one or more server computing systems associated with one or more respective vendors, while first-party clients can include autonomous vehicles associated with the service provider entity and/or one or more server computing systems and/or system clients associated with the service provider entity configured to host the VIP. Various first-party and/or third-party clients can be integrated with the VIP for purposes of coordinating implementation of one or more services (e.g., vehicle-based transportation services) across different parties, geographic locations, and the like.

As one example, in some implementations, a VIP may receive, ingest, and store vehicle state data (e.g., location, heading, speed, and/or other operational statuses) from one or more autonomous vehicles and a server computing system can interact with the VIP to obtain the stored vehicle data. Likewise, communications such as transportation service requests/responses can flow between a server computing system and an autonomous vehicle (and vice versa) via the VIP. Thus, in some implementations, the VIP can serve as an intermediary or other form of participant in a ride-sharing network that facilitates transportation services to be rendered via autonomous vehicles (e.g., first-party and/or third-party vehicles/services).

A VIP system as disclosed herein can use actual vehicle communications traffic to help determine the overall health of the VIP system. This solution is tenable as long as there is sufficient communications traffic from a vehicle fleet. But often the vehicle fleet is offline, resulting in no vehicles reporting or otherwise occurring via the VIP system, and potentially causing false positives and/or incorrect metric calculations. When a number of false positives is generally large, it can cause a monitoring system or associated client to become complacent in investigating since most of the time there is not an actual performance problem. Additionally or alternatively, it can be difficult to track VIP uptime during scenarios when the VIP is not available, but no clients are attempting to access the VIP. In other words, the monitoring system can fail silently when performance is jeopardized during a period of time with no client activity on the VIP system.

In response to these challenges, the disclosed technology helps compute more accurate uptime and health metrics and eliminate false positives by creating a watchdog monitoring system that ensures a sufficient level of vehicle communications traffic over time. The watchdog system can function as a monitoring system configured to maintain oversight over VIP performance and activities to ensure that operational standards of communication are both met and maintained over time. In particular, the disclosed monitoring technology can help track the overall health and correctness and functionality of a VIP by ensuring a consistent level of minimum operational communications traffic on the VIP system. In instances when actual vehicle communications traffic is unavailable (e.g., when fleets are offline, charging, or otherwise not deployed for service), features of the disclosed technology can be particularly advantageous. This is due at least in part to the potential for false positive alerts and inaccurate monitoring that can occur when regular vehicle communications traffic is reduced or entirely offline.

According to an aspect of the disclosed technology, a computer-implemented monitoring system (which is referred to herein as a "watchdog monitoring system") and associated methods can be implemented alone or as part of a VIP and associated communication infrastructure. The VIP can include a plurality of application programming interfaces configured to facilitate message communication among clients, the clients comprising at least one third-party client associated with a fleet of autonomous vehicles and at least one first-party client associated with a service provider entity. In some implementations, a watchdog system configured according to the disclosed technology can include one or more processors and one or more memories including instructions that, when executed by the one or more processors, cause the one or more processors to perform operations.

In some implementations, to assist in monitoring the VIP, the watchdog system can determine a first level of communications traffic indicative of an amount of actual communications traffic occurring via the VIP. In some implementations, the first level of communications traffic indicative of the amount of actual communications traffic is a first level of vehicle communications traffic indicative of an amount of actual vehicle communications traffic occurring via the VIP. Actual vehicles can correspond, for example, to self-driving autonomous vehicles, such as but not limited to land-based vehicles (automobiles, trucks, bikes, scooters, and/or other passenger vehicles or light electric vehicles), and air-based vehicles (e.g., planes, drones, helicopters, etc.). In some implementations, the first level of communications traffic indicative of the amount of actual communications traffic is a first level of infrastructure client communications traffic indicative of an amount of actual infrastructure client communications traffic occurring via the VIP. Infrastructure clients can correspond, for example, to fleet managers, vehicle command centers, dispatchers, remote assistance entities, oversight entities, service entity overseers, and/or others. In some implementations, the actual communications traffic is a combination of both vehicle communications traffic and infrastructure client communications traffic.

The watchdog system can determine a predetermined minimum level of desired communications traffic occurring via the VIP. The predetermined minimum level of desired communications traffic can correspond to a level of traffic that enables one or more various performance measures of the VIP are able to be evaluated. Stated differently, providing the VIP with the predetermined minimum level of desired communications traffic can enable the performance measures to be evaluated for the VIP, whereas less traffic than the minimum level may distort, render inaccurate, or prevent evaluation of the performance measures.

In some implementations, the predetermined minimum level of desired communications traffic can be defined relative to a maximum recommended network load for the VIP. For instance, in some implementations, the predetermined minimum level of desired communications traffic can correspond to a percentage of the maximum recommended network load (e.g., 30% of the maximum network load, 50% of the maximum network load, or another predetermined percentage of level). In some implementations, the predetermined minimum level of desired communications traffic can be static over time. In other implementations, the predetermined minimum level can vary over time (e.g., fluctuate according to hour of the day, day of the week, etc.). As one example, the predetermined minimum level of communications traffic can have a square wave in which it equals zero for some periods of time but equals a non-zero value for other periods of time (e.g., which may potentially be the minority amount of time overall). Such a function may enable periodic, but not completely continuous, performance monitoring of the VIP. In some implementations, the predetermined minimum level of desired communications traffic can be a function and/or variable that can be controlled by a user via a user interface. In some implementations, the predetermined minimum level of desired communications traffic can be designed based on testing of the VIP, such that the predetermined minimum level of desired communications traffic affords a correct level of traffic over time to enable the VIP to perform at an optimal level. In some implementations, the predetermined minimum level of desired communications traffic can be an output of a machine-learned model that has been trained based on historical data that describes VIP performance relative to total communications traffic over time.

After assessing the first level of communications traffic and the predetermined minimum level of desired communications traffic, the watchdog system can generate a second level of communications traffic. The second level of communications traffic can include an amount of simulated communications traffic determined such that the second level of communications traffic plus the first level of communications traffic is greater than or equal to the predetermined minimum level of desired communications traffic. For example, if the predetermined minimum level of desired communications traffic is 100 clients, and the first level of communications traffic is determined to be 40 clients, then the second level of communications traffic can be generated to exceed 60 clients.

In some implementations, the second level of communications traffic generated by the disclosed watchdog system can be configured such that the first level of communications traffic and the second level of communications traffic are indistinguishable by the VIP. In other words, communications traffic associated with actual clients and simulated clients can appear the same to various entities within or connected to the VIP system. As one example, to facilitate this indistinguishable characteristic, historical actual communications traffic can be stored and then re-used (e.g., with certain values fuzzed or otherwise changed) in the form of simulated communications traffic. The simulated data can be generated by the watchdog system or by another system and then accessed by the watchdog system. In one example, a generative machine-learned model can be used to generate the simulated data. For example, the generative machine-learned model can be trained as part of a generative adversarial network trained to generate communications data that is indistinguishable from actual communications data by a discriminator model.

The watchdog system or other system component can monitor one or more performance characteristics of the VIP while at least the second level of communications traffic is occurring via the VIP. Thus, various performance characteristics of the VIP can be monitored through generation and submission of the simulated communications traffic with respect to the VIP even in instances in which the first communications traffic is not present or otherwise at significant volumes. As such, the watchdog system can enable superior and more consistent monitoring of VIP performance despite natural fluctuations in actual client activity.

In some implementations, the one or more performance characteristics of the VIP can include at least one latency value determined for a request communicated by one of the clients through the VIP between first and second communication nodes thereof. As one example, the latency value can describe how long it took a communication initiated by the first communication node (e.g., which may be included in the watchdog system) and carried via the VIP to reach the second communication node (e.g., which also may be included in the watchdog system). This may be referred to as a "one-way latency." As another example, the latency value can describe how long it took for both (i) a first communication initiated by the first communication node and carried via the VIP to reach the second communication node and (ii) a second communication—which may be responsive to the first communication—initiated by the second communication node and carried via the VIP to reach the first communication node. This may be referred to as a "round-trip latency."

In some implementations, the one or more performance characteristics can include a transmission performance rating associated with one or more of a request provided to the VIP and a response received from the VIP. As one example, the transmission performance rating can describe whether the VIP successfully received the request and/or whether the VIP successfully provided the response (e.g., including determining whether the response provided by the VIP supplies the information actually requested by the request and/or according to an appropriate data structure or formatting). As another example, the transmission performance rating can describe an accuracy of a request provided to the VIP and/or a response received from the VIP (e.g., in terms of number of packets dropped or otherwise lost or other measures of communications content accuracy).

The watchdog system can thus measure correctness of requests/streams since it will have knowledge of the request and response structure, thus having an ability to determine if there is an issue in the transmission of the request. Stated differently, by operating on both sides of the VIP when the VIP is acting as an intermediary, the watchdog system can identify for which aspects of data receipt and/or transmission the VIP has failed. In particular, not only do the techniques described herein enable asserting that the VIP system is up/available, but also that, given an input, the corresponding output is correct and as expected. As one example, if a vehicle emits a certain latitude/longitude position, the watchdog can ensure that that exact latitude/longitude is propagated from the VIP as well, erroring if it is some other value than what was input (and similarly for any other type of telemetry). Thus, one function is to ensure that the VIP relays the data correctly and/or has the expected transformations and side effects.

In some implementations, the one or more performance characteristics can include an amount of actual communications traffic, an amount of simulated communications traffic, and/or an amount of total communications traffic occurring via the VIP such that network load metrics can be determined and published. In some implementations, the one or more performance characteristics can include a breakdown of communications traffic types including vehicle communications traffic and infrastructure client communications traffic occurring via the VIP.

Another operational aspect of the disclosed technology, in some implementations, can involve periodically publishing the one or more performance characteristics or other metrics determined by the disclosed watchdog monitoring system to a source accessible by one or more clients of the VIP. In some implementations, the disclosed technology can include generating an alert when the one or more performance characteristics of the VIP satisfy one or more predetermined conditions. For example, when the one or more performance conditions fall below one or more predetermined thresholds, an alert can be sent to an information technologies team that manages and optimizes performance of the VIP. In another example, an alert can be sent to clients of the VIP to inform them, in some example scenarios, that the VIP is currently offline or otherwise experiencing unreliability. For example, in some of such example scenarios, the alert can instruct the clients of the VIP to either place a hold on their communications traffic intended for the VIP or to re-route the traffic to a backup or emergency service. Thus, the alert can be relayed to one of the clients of the VIP and/or operators of the VIP. In some implementation, the publishing and/or alert generating and relaying can be implemented periodically to dynamically ensure over different increments of time that the second level of communications traffic plus the first level of communications traffic is greater than or equal to the predetermined minimum level of desired communications traffic occurring via the VIP.

According to another aspect of the disclosed technology, in some implementations, clients of the VIP include infrastructure clients associated with a service provider entity or other entity hosting the VIP system. Some such infrastructure clients are in need of state data associated with vehicles connected to and occurring via the VIP system. Example state data can include, for example, data descriptive of a current operational mode of a vehicle (e.g., online, offline, autonomous, non-autonomous, charging, non-charging, maintenance modes, service modes, etc.), data descriptive of one or more functional components of a vehicle (e.g., status of doors being locked or unlocked, data storage levels, fuel levels, battery charge levels, geographic position, nearby communications traffic levels, status of passengers or objects in a vehicle (e.g., existence and/or number of passengers, packages, or the like). In some implementations, simulated vehicle communications traffic generated by the disclosed watchdog system can include generated vehicle state data of a similar nature to vehicle state communications traffic received from actual vehicle communications traffic occurring via the VIP system.

According to another aspect of the disclosed technology, in some implementations, simulated vehicle communications traffic generated by the disclosed watchdog system can be fuzzed to allow for greater approximation of client communications traffic including vehicle communications traffic and/or infrastructure client communications traffic. More particularly, if a second level of simulated vehicle communications traffic is generated by a watchdog system in accordance with the disclosed technology, then the second level of vehicle communications traffic can be configured to oscillate within a range defined relative to the second level. For example, if the second level of vehicle communications traffic is defined by a number X of vehicles, then fuzzing can ensure that the second level of vehicle communications traffic is randomly varied in a range defined by [X, X+i], where i is a variable defining the fuzzing range. In some implementations, selection of the fuzzing range variable and other associated characteristics can be made to help ensure that fuzzed communications traffic will not cause invalid alerts or inaccurate metrics.

According to another aspect of the disclosed technology, in some implementations, the watchdog system can be configured to scale the generated levels of simulated vehicle communications traffic alongside network load. More particularly, the watchdog system can be configured to scale the number of connections to the VIP based on a current level of network load. This will allow reduction in the load placed on the VIP when actual communications traffic can be used for performance characteristic measurements and associated alerting.

With more particular reference to the VIP, such component can facilitate secure, bidirectional communications between autonomous vehicles associated with a plurality of entities and a provider infrastructure such as, for example, a service provider entity's operations system (e.g., including a data center). To do so, the service provider infrastructure can include a platform comprising one or more application programming interfaces (APIs) that are configured to allow autonomous vehicles associated with one or more entities and one or more provider infrastructure endpoints (e.g., system clients, etc.) to efficiently communicate. In some implementations, communication via the VIP can be for purposes of coordinating implementation of one or more services (e.g., vehicle-based transportation services such as ride-share services, delivery services, courier services, etc.) across different parties, geographic locations, and the like. In the example of a vehicle-based transportation service, third-party clients can communicate with the VIP in addition to first-party clients so that all such clients can accept service-related trips managed by the service provider entity.

The computing system associated with the service provider entity (e.g., the system that includes the VIP watchdog) can provide one or more platforms to facilitate and manage communications between autonomous vehicles associated with a plurality of entities and one or more backend systems of a service entity. For example, a service provider infrastructure can include a "public" platform and a "private" platform which can facilitate communication between autonomous vehicles and one or more service provider infrastructure endpoints to provide for facilitating services provided by the autonomous vehicles. As a further example, the public platform associated with the service provider infrastructure can facilitate communication between the service provider infrastructure and autonomous vehicles associated with the service provider entity, as well as between the service provider infrastructure and one or more other entities (e.g., third-party entities (other than the service provider entity) managing autonomous vehicle fleets, etc.). The public platform can allow for services-related communication (e.g., trip services, routing services, etc.) between the service provider infrastructure and the autonomous vehicles and/or other entity system(s) (e.g., third-party entity systems managing autonomous vehicle fleets). Additionally, the private platform associated with the service provider infrastructure can facilitate communication between the service provider infrastructure and autonomous vehicles associated with the service provider entity. The private platform can allow for communication associated with the service provider autonomous vehicle-specific services (proprietary/internal services) in the service provider infrastructure (e.g., fleet management, remote autonomy assistance, etc.) between the service provider infrastructure and the autonomous vehicles of the service provider entity.

The service provider entity (e.g., owner, manager, etc.) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can obtain sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, an autonomous vehicle can be configured to communicate with one or more computing devices that are remote from the vehicle. For example, the autonomous vehicle can communicate with a remote computing system that can be associated with the entity, such as the entity's operations computing system. The operations computing system can include a plurality of system clients that can help the entity monitor, communicate with, manage, etc. autonomous vehicles. In this way, the entity can manage the autonomous vehicles to provide the vehicle services of the entity.

The autonomous vehicles utilized by the service provider entity to provide the vehicle service can be associated with a fleet of the service provider entity or a third party. For example, the service provider entity may own, lease, etc. a fleet of autonomous vehicles that can be managed by the service provider entity (e.g., the system clients) to provide one or more vehicle services. An autonomous vehicle utilized to provide the vehicle service(s) can be included in this fleet of the service provider entity. In some implementations, an autonomous vehicle can be associated with a third party such as, for example, an individual, an original equipment manufacturer (OEM), or another entity. Even though such an autonomous vehicle may not be included in the fleet of autonomous vehicles of the service provider entity, the platforms of the present disclosure can allow the autonomous vehicle to still be utilized to provide the vehicles services offered by the entity, access its system clients, etc.

According to an aspect of the present disclosure, a service provider entity infrastructure can include a public platform and a private platform to facilitate services between the service provider entity infrastructure and autonomous vehicles associated with one or more entities (e.g., associated with the service provider, associated with third party vendors, etc.). The public platform can facilitate access to provider services by autonomous vehicles associated with the service provider and by autonomous vehicles associated with one or more third party vendors. The public platform can provide access to provider services such as trip assignment services, routing services, supply positioning services, payment services and/or the like. The private platform can provide access to provider services that are specific to the service provider autonomous vehicle fleet such as fleet management services, autonomy assistance services, and/or the like. Both the public platform and the private platform each include a Gateway API to facilitate communication from the autonomous vehicles to the service provider backend infrastructure services (e.g., backend system clients, etc.) and a Vehicle API to facilitate communication from the service provider backend infrastructure services to the autonomous vehicles. Each of the platform's APIs can have separate responsibilities, monitoring, alerting, tracing, service level agreements (SLAs), and/or the like.

For example, the public platform Gateway API can abstract the service provider infrastructure from the service provider autonomous vehicles and third party vendor autonomous vehicles and facilitate requests from both the service provider autonomous vehicles and third party vendor autonomous vehicles to communicate with the service provider backend infrastructure. The public platform Vehicle API can abstract the service provider autonomous vehicles and third party vendor autonomous vehicles from the service provider infrastructure and facilitate requests from the service provider infrastructure backend services to communicate with both the service provider autonomous vehicles and third party vendor autonomous vehicles. The private Gateway API can abstract the service provider infrastructure from the service provider autonomous vehicles and facilitate requests from the service provider autonomous vehicles to communicate with the service provider backend infrastructure. The private platform Vehicle API can abstract the service provider autonomous vehicles from the service provider infrastructure and facilitate requests from the service provider infrastructure backend services to communicate with the service provider autonomous vehicles.

More particularly, the platforms can be logically consolidated points of ingress and egress of all communications from and/or to the autonomous vehicles (and/or third party vendor systems) and a service provider infrastructure. Moreover, the platforms can be logical constructs that contain all vehicle and/or service facing interfaces. For example, the platform can include a plurality of backend interfaces. Each backend interface can be associated with at least one system client. A system client can be the hardware and/or software implemented on a computing system (e.g., of the service provider entity) that is remote from the autonomous vehicle and that provides a particular back-end service to an autonomous vehicle (e.g., scheduling of vehicle service assignments, routing services, etc.). A backend interface can be the interface (e.g., a normalized interface) that allows one application and/or system (e.g., of the autonomous vehicle) to provide data to and/or obtain data from another application and/or system (e.g., a system client). Each backend interface can have one or more functions that are associated with the particular backend interface. The autonomous vehicle can provide a communication to the platform to call a function of a backend interface. In this way, the backend interfaces can be an external facing edge of the service provider infrastructure that is responsible for providing a secure tunnel for a vehicle and/or other system to communicate with a particular system client so that the vehicle and/or other system can utilize the backend service associated with that system client, and vice versa.

The service provider entity infrastructure can include an API proxy to act as a central gateway to the public platform as well as provide an API management platform to provide security, reliability, scalability, and abstraction for the backend services. For example, in some implementations, the API proxy can provide authentication and security (e.g., access control), throttling and/or rate limiting, caching, API management tools, schema validation, analytics, development tools, standardized logon and metrics, and/or the like.

In some implementations, the platforms can provide for chain-based certificates to provide security, whereby certificates are hierarchical and traceable. For example, chain-based certificates provide for certificate chaining to establish hierarchical chains of trust that extend to each vendor and to each of the vendor's autonomous vehicles. The chain-based model can allow for revoking a certificate for a single autonomous vehicle and for revoking a certificate for the entire vendor fleet.

Various means can be configured to perform the methods and processes described herein. For example, a computing system can include first communications traffic level determining unit(s), minimum desired communications traffic level determining unit(s), second communications traffic level generating unit(s), performance characteristic monitoring unit(s), periodic publishing unit(s), alert generation and relay unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to determine a first level of communications traffic indicative of an amount of actual communications traffic occurring via the VIP. In some implementations, the first level of communications traffic indicative of an amount of actual communications traffic is a first level of vehicle communications traffic indicative of an amount of actual vehicle communications traffic occurring via the VIP. In some implementations, the actual communications traffic is a combination of both vehicle communications traffic and infrastructure client communications traffic. A first communications traffic level determining unit is one example of a means for determining a first level of communications traffic as described herein.

The means can be additionally or alternatively programmed to determine a predetermined minimum level of desired communications traffic occurring via the VIP. In some implementations, the predetermined minimum level of desired communications traffic can be defined relative to a maximum recommended network load for the VIP. For instance, in some implementations, the predetermined minimum level of desired communications traffic can correspond to a percentage of the maximum recommended network load (e.g., 30% of the maximum network load, 50% of the maximum network load, or other predetermined percentage of level). A minimum desired communications traffic level determining unit is one example of a means for determining a minimum desired communications traffic level as described herein.

The means can be additionally or alternatively programmed to generate a second level of communications traffic. The second level of communications traffic can include an amount of simulated communications traffic determined such that the second level of communications traffic plus the first level of communications traffic is greater than or equal to the predetermined minimum level of desired communications traffic occurring via the VIP. The second level of communications traffic generated by the disclosed watchdog system can be configured such that the first level of communications traffic and the second level of communications traffic are indistinguishable by the VIP. In other words, communications traffic associated with actual clients and simulated clients can appear the same to various entities within or connected to the VIP system. A second communications traffic level generating unit is one example of a means for generating a second level of communications traffic as described herein.

The means can be additionally or alternatively programmed to monitor one or more performance characteristics of the VIP while at least the second level of communications traffic is occurring via the VIP. In some implementations, the one or more performance characteristics of the VIP can include at least one latency value determined for a request communicated by one of the clients through the VIP between first and second communication nodes thereof. In some implementations, the one or more performance characteristics can include a transmission performance rating associated with one or more of a request provided to the VIP and a response received from the VIP. The watchdog system can thus measure correctness of requests/streams since it will have knowledge of the request and response structure, thus having an ability to determine if there is an issue in the transmission of the request. In some implementations, the one or more performance characteristics can include an amount of actual communications traffic, an amount of simulated communications traffic, and/or an amount of total communications traffic occurring via the VIP such that network load metrics can be determined and published. In some implementations, the one or more performance characteristics can include a breakdown of communications traffic types including vehicle communications traffic and infrastructure client communications traffic occurring via the VIP. A performance characteristic monitoring unit is one example of a means for monitoring performance characteristics as described herein.

The means can be additionally or alternatively programmed to periodically publish information associated with VIP communications traffic. For example, in some implementations, such means can involve periodically publishing the one or more performance characteristics or other metrics determined by the disclosed watchdog monitoring system to a source accessible by one or more clients of the VIP. In some implementations, one or more levels of communications traffic (e.g., the first level of communications traffic, the predetermined minimum level of communications traffic, and/or the second level of communications traffic) can also be periodically published to a source accessible by one or more clients of the VIP. In some implementation, the publishing can be implemented periodically to dynamically ensure over different increments of time that the second level of communications traffic plus the first level of communications traffic is greater than or equal to the predetermined minimum level of desired communications traffic occurring via the VIP. A periodic publishing unit is one example means for periodically publishing performance characteristic data, network load data, or the like as described herein.

The means can be additionally or alternatively programmed to generate and relay alerts. In some implementations, such means can be programmed to generate an alert when the one or more performance characteristics of the VIP satisfy one or more predetermined conditions. In some implementations, the means can be further programmed to relay the alerts to one or more clients of the VIP. In some implementations, the alert generating and relaying can be implemented periodically to dynamically ensure over different increments of time that various performance characteristics are meeting and maintaining predetermined criteria. An alert generation and relay unit is one example means for generating and relaying alerts as described herein.

The systems and methods described herein provide a number of technical effects and benefits. For instance, the disclosed monitoring technology is advantageous in order to help understand and track the overall health and functionality of a VIP, thus better serving the end customers or clients of the VIP. Detecting potential issues with the VIP system and alerting appropriate clients or other entities can be paramount to providing a level of service required for enhanced client functionality on the system.

Additional technical effects and benefits of the disclosed technology are achieved by providing generated vehicle communications traffic in order to produce an accurate measurement of the reliability and uptime for the VIP system. In addition, the disclosed technology can provide a level of fidelity such that the generated simulated vehicle communications traffic is indistinguishable from actual vehicle communications traffic or infrastructure communications traffic. Still further, the disclosed technology can help ensure that non-health related metrics will not be contaminated by the generated watchdog communications traffic.

Still further technical effects and benefits of the disclosed technology are achieved by providing improved monitoring and performance assurance to a plurality of different system partners. For example, the disclosed monitoring systems can provide improvements to VIP clients and other customers, including but not limited to, fleet managers, vehicle command centers, dispatchers, remote assistance entities, oversight, service entity overseers, and others. The disclosed watchdog technology can provide better metrics and quantifiable parameters for service level agreements (SLAs), thus allowing customers to have a higher confidence in VIP quality and stability. Better SLA reporting can also provide more accurate measures of VIP performance against VIP migration SLA requirements, as new clients are onboarded to the VIP system.

The systems and methods of the present disclosure can provide an improvement to vehicle computing technology, such as autonomous vehicle computing technology and the remote computing systems associated therewith. For instance, the platforms, application programming interfaces, watchdog monitoring systems, other systems, and methods of the present disclosure provide a more robust and verified infrastructure for communicating data to and/or from autonomous vehicles and computing systems remote from the autonomous vehicles. For example, a computing system (e.g., of an autonomous vehicle or an infrastructure client) can generate a communication intended for another client of a VIP. Because of the disclosed features for determining a first level of communications traffic and dynamically determining a second level of communications traffic that ensures adequate monitoring of various VIP communication performance characteristics, the integrity of the communication platform can be better ensured and maintained over time in a manner that is independent of the level of actual communications traffic on the platform.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although certain Figures may respectively depict steps performed in a particular order for purposes of illustration and discussion, the methods of the present disclosure are not limited to the particularly illustrated order or arrangement. The various steps of the disclosed methods can be omitted, rearranged, combined, and/or adapted in various ways without deviating from the scope of the present disclosure.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
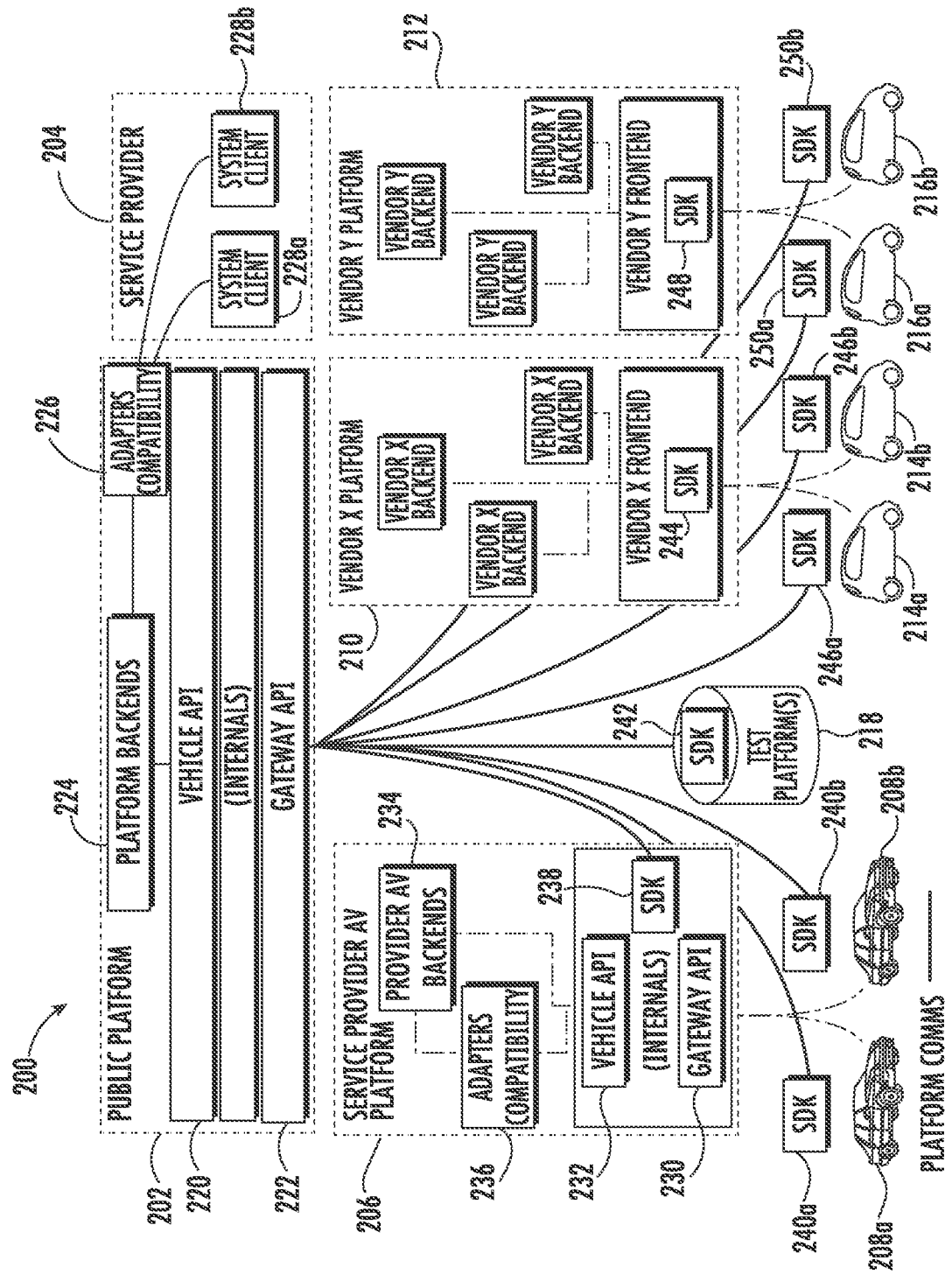
FIG. 2 depicts an example infrastructure system according to example embodiments of the present disclosure.

FIG. 2 depicts an example service infrastructure 200 according to example embodiments of the present disclosure. As illustrated in FIG. 2, an example service infrastructure 200, according to example embodiments of the present disclosure, can include an application programming interface platform (e.g., public platform) 202, a service provider system 204, a service provider autonomous vehicle platform (e.g., private platform) 206, one or more service provider autonomous vehicles (e.g., in a service provider fleet) such as autonomous vehicles 208a and 208b, and one or more test platforms 218. Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as third-party autonomous vehicles 214a, 214b, 216a, and 216b. In some implementations, the VIP component described herein can include one or more of the platforms and related components illustrated in the service infrastructure 200 of FIG. 2.

As described herein, a service infrastructure 200 can include a public platform 202 to facilitate vehicle services (e.g., provided via one or more system clients (228a, 228b) associated with a service provider operations computing system) between the service provider infrastructure system 204 (e.g., operations computing system, etc.) and vehicles associated with one or more entities (e.g., associated with the service provider (208a, 208b), associated with third-party entities (214a, 214b, 216a, 216b), etc.). For example, in some embodiments, the public platform 202 can provide access to service provider services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service provider infrastructure services (e.g., system clients 228a, 228b, etc.) and a vehicle API (e.g., vehicle API 220) to facilitate communication from the service provider infrastructure services (e.g., system clients 228a, 228b, etc.) to the autonomous vehicles (e.g., 208a, 208b, 214a, 214b, 216a, 216b).

In some embodiments, the public platform 202 can be a logical construct that contains all vehicle and/or service facing interfaces. The public platform 202 can include a plurality of backend services interfaces (e.g., public platform backend interfaces 224). Each backend interface 224 can be associated with at least one system client (e.g., service provider system 204 clients such as system clients 228a and 228b). A system client (e.g., 228a, 228b, etc.) can be the hardware and/or software implemented on a computing system (e.g., operations computing system of the service provider) that is remote from the autonomous vehicle and that provides a particular back-end service to an autonomous vehicle (e.g., scheduling of vehicle service assignments, routing services, payment services, user services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular backend interface. An autonomous vehicle can provide a communication to the public platform 202 to call a function of a backend interface. In this way, the backend interfaces can be an external facing edge of the service provider infrastructure system 204 that is responsible for providing a secure tunnel for a vehicle and/or other system to communicate with a particular service provider system client (e.g., 228a, 228b, etc.) so that the vehicle and/or other system can utilize the backend service associated with that particular service provider system client (e.g., 228a, 228b, etc.), and vice versa.

In some embodiments, the public platform 202 can include one or more adapters 226, for example, to provide compatibility between one or more backend interfaces 224 and one or more service provider system clients (e.g., 228a, 228b, etc.). In some embodiments, the adapter(s) 226 can provide upstream and/or downstream separation between the service provider operations computing system 204 (e.g., system clients 228a, 228b, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228a, 228b) associated with the service provider operations computing system) between the service provider infrastructure system 204 (e.g., operations computing system, etc.) and autonomous vehicles associated with the service provider (e.g., autonomous vehicles 208a, 208b). For example, in some embodiments, the private platform 206 can provide access to service provider services that are specific to the service provider autonomous vehicle fleet (e.g., vehicles 208a and 208b) such as fleet management services, autonomy assistance services, and/or the like.

The private platform 206 can include a gateway API (e.g., gateway API 230) to facilitate communication from the autonomous vehicles 208a, 208b to one or more service provider infrastructure services (e.g., via the public platform 202, via one or more service provider autonomous vehicle backend interfaces 234, etc.) and a vehicle API (e.g., vehicle API 232) to facilitate communication from the service provider infrastructure services (e.g., via the public platform 202, via one or more service provider autonomous vehicle backend interfaces 234, etc.) to the autonomous vehicles 208a, 208b. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service provider autonomous vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity autonomous vehicles (e.g., in a third-party entity autonomous vehicle fleet) such as third-party autonomous vehicles 214a, 214, 216a, and 216b. The third-party entity platforms 210, 212 can be distinct and remote from the service provide infrastructure and provide for management of vehicles associated with a third-party entity fleet, such as third-party entity (e.g., Vendor X) autonomous vehicles 214a, 214b and third-party entity (e.g., Vendor Y) autonomous vehicles 216a, 216b. The third-party entity (e.g., Vendor X) platform 210 and third-party entity (e.g., Vendor Y) platform 212, and/or third-party entity (e.g., Vendor X) autonomous vehicles 214a, 214b and third-party entity (e.g., Vendor Y) autonomous vehicles 216a, 216b can communicate with the service provider operations computing system 204 (e.g., system clients, etc.) via the public platform 202 to allow the third-party entity platforms and/or vehicles to access one or more service provider infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public platform 202 for use by both the service provider autonomous vehicles (208a, 208b) and the third-party entity autonomous vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service provider autonomous vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single entry point into the service provider infrastructure (e.g., public platform 202, etc.), which can improve consistency across both the service provider fleet and the third-party entity fleet(s). As an example, a public SDK can provide secured access to the public platform 202 by both service provider vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service provider vehicles and provide access to capabilities such as remote assistance, vehicle management, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service provider's services. For example, based on the authentication certificate, a command-line interface can determine which version of the SDK (e.g., public or private) to which to provide access.

Figure 3:
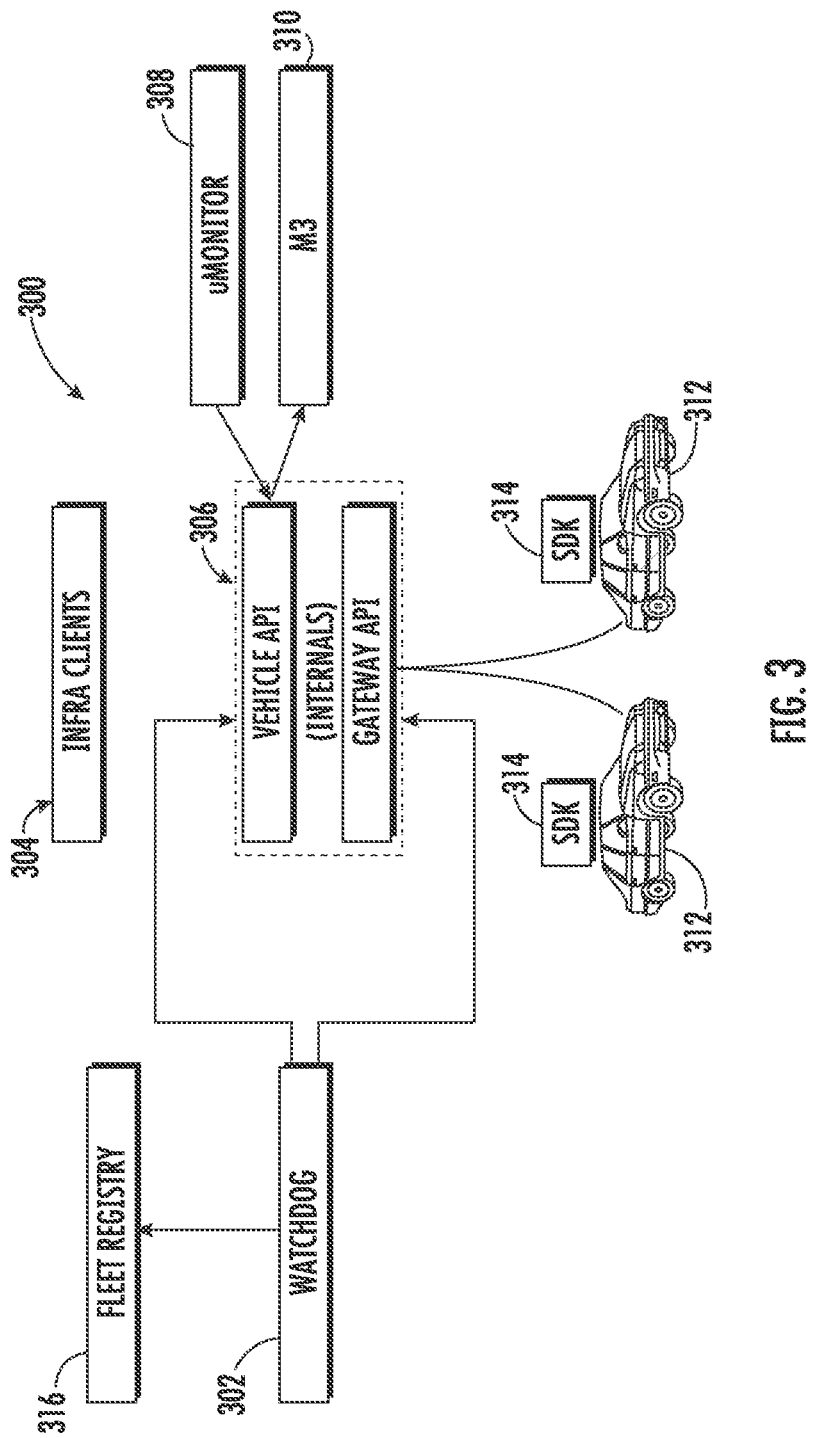
FIG. 3 depicts a first block diagram of an example watchdog system according to example embodiments of the present disclosure.

FIG. 3 depicts a first block diagram of an example computing system 300 that includes a watchdog system 302 configured to assist in evaluating a performance of a vehicle integration platform (VIP) 306.

The VIP 306 can communicate with one or more clients which may include, as examples, one or more infrastructure clients 304 and/or one or more autonomous vehicles 312a and 312b.

Infrastructure clients 304 can correspond, for example, to fleet managers, vehicle command centers, dispatchers, remote assistance entities, oversight entities, service entity overseers, and/or others.

As described with reference to FIG. 2, and elsewhere herein, each autonomous vehicle 312a-b can, in some implementations, include and utilize an SDK 314a-b to communicate or otherwise interact with the VIP 306.

The infrastructure clients 304, the autonomous vehicles 312a-b, and/or other clients of the VIP 306 can be first-party client and/or third-party clients.

According to aspects of the present disclosure, the watchdog service 302 can generate both SDV and infrastructure traffic in order to eliminate false positives and allow metrics to accurately reflect health of the VIP 306. The generated traffic will ensure that there is always enough SDV or infrastructure traffic that alerts can rely on this traffic to detect issues with the VIP 306.

In some implementations, the watchdog process 302 can also publish metrics that can be used to detect issues with the VIP 306. For example, the watchdog process 302 can calculate latency of requests that go through the VIP 306 and publish these latency values. Alerts can then be generated based on the latency measurements. In some implementations, the VIP 306 system will publish latency measurements as well.

Figure 4:
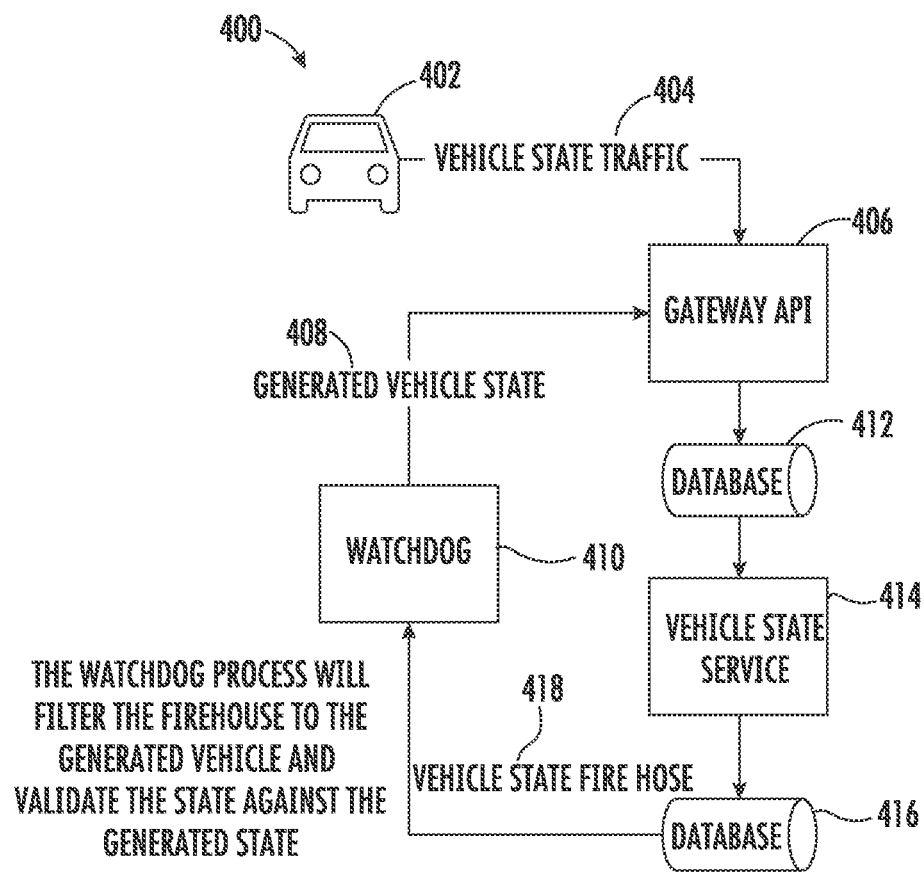
FIG. 4 depicts a second block diagram of an example watchdog system according to example embodiments of the present disclosure.

FIG. 4 depicts a second block diagram of an example system 400 that includes a watchdog system 410 according to example embodiments of the present disclosure. The example system 400 can include an autonomous vehicle 402. The autonomous vehicle 402 can generate and transmit vehicle state traffic 404 to a Gateway API 406.

The Gateway API 406 can pass the received vehicle state traffic 404 to a first datapipe 412, which can pass the data to a vehicle state service 414. The vehicle state service 414 can pass data to a second datapipe 416. The second datapipe 416 can pass data vie a vehicle state firehose 418 to the watchdog system 410.

The watchdog system 410 can filter the vehicle state firehose 418 to a generated vehicle and validate the state against the generated state. The watchdog system 410 can pass the generated vehicle state 408 to the Gateway API 406.

Figure 5:
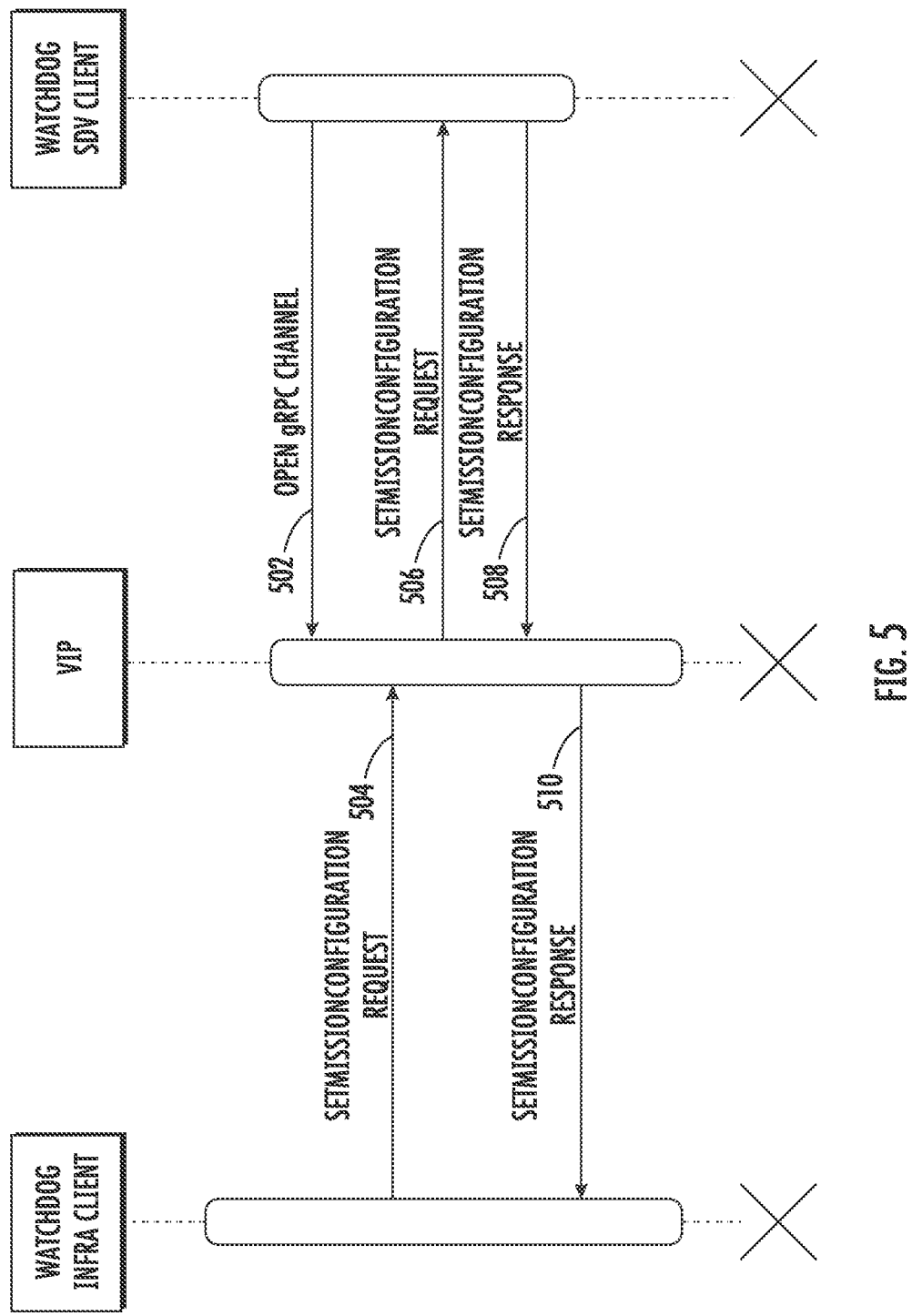
FIG. 5 depicts a graphical display of communications between a watchdog system and a vehicle integration platform according to example embodiments of the present disclosure.

FIG. 5 depicts a graphical display of communications between a watchdog system and a vehicle integration platform according to example embodiments of the present disclosure. For example, the example communications displayed in FIG. 5 can be performed by the watchdog system to evaluate one or more performance metrics (e.g., latency or other metrics) of the VIP at various intervals and with varying amounts of communications traffic handled thereby.

At 502, a watchdog self-driving vehicle client can open a gRPC channel with the VIP. At 504, a watchdog infrastructure client can send a set mission configuration request to the VIP. At 506, the watchdog self-driving vehicle client can receive the set mission configuration request from the VIP. At 508, the watchdog self-driving vehicle client can send a set mission configuration response to the VIP. At 510, the watchdog infrastructure client can receive the set mission configuration response from the VIP.

In such fashion, the watchdog infrastructure client can test the VIP's ability to pass a mission configuration request to the watchdog self-driving vehicle client and to receive and pass the corresponding set mission configuration response from the watchdog self-driving vehicle client. In particular, because the watchdog system operates the clients on both sides of the VIP, the watchdog system can identify exactly which, if any, of the communications 502-510 the VIP fails to facilitate.

In particular, in some implementations, the watchdog process will also measure the correctness of requests/streams. Since the watchdog process will have knowledge of the request and response structure the watchdog process can determine if there is an issue in the transmission of the request. The watchdog process will also alter on possible latency related issues.

FIG. 6 depicts a block diagram of an example computing system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include the vehicle computing system 112 of the autonomous vehicle 102 and a remote computing system 620 (e.g., operations computing system, other computing system, etc. that is remote from the vehicle 102) that can be communicatively coupled to one another over one or more network(s) 640. The remote computing system 620 can be and/or include the operations computing system 104 and/or remote computing system 106 of FIG. 1. The remote computing system 620 can be associated with a central operations system and/or an entity associated with the vehicle 102 such as, for example, a vehicle owner, vehicle manager, fleet operator, service provider, etc. For instance, the remote computing system 620 can be or otherwise include the remote computing system 104 described herein.

The computing device(s) 601 of the vehicle computing system 112 can include processor(s) 602 and at least one memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, magnetic disks, data registers, etc., and combinations thereof.

The memory 604 can store information that can be accessed by the one or more processors 602. For instance, the memory 604 (e.g., one or more non-transitory computer-readable storage mediums, memory devices) can include computer-readable instructions 806 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 102 can store instructions 606 that when executed by the one or more processors 602 cause the one or more processors 602 (e.g., in the vehicle computing system 112) to perform operations such as any of the operations and functions of the computing device(s) 601 and/or vehicle computing system 112, any of the operations and functions for which the vehicle computing system 112 is configured, and/or any other operations and functions described herein.

The memory 604 can store data 608 that can be obtained (e.g., received, accessed, written, manipulated, created, generated, etc.) and/or stored. The data 608 can include, for instance, services data (e.g., trip data, route data, user data, etc.), sensor data, map data, perception data, prediction data, motion planning data, object states and/or state data, object motion trajectories, feedback data, fault data, log data, and/or other data/information as described herein. In some implementations, the computing device(s) 601 can obtain data from one or more memories that are remote from the autonomous vehicle 102.

The computing device(s) 601 can also include a communication interface 610 used to communicate with one or more other system(s) (e.g., the remote computing system 620). The communication interface 610 can include any circuits, components, software, etc. for communicating via one or more networks (e.g., network(s) 640). In some implementations, the communication interface 610 can include, for example, one or more of a communications controller, receiver, transceiver, transmitter, port, conductors, software, and/or hardware for communicating data.

The remote computing system 620 can include one or more computing device(s) 621. The computing device(s) 621 can include one or more processors 622 and at least one memory 624. The one or more processors 622 can be any suitable processing device (e.g., a processor core, a microprocessor, an ASIC, a FPGA, a controller, a microcontroller, etc.) and can be one processor or a plurality of processors that are operatively connected. The memory 624 can include one or more tangible, non-transitory computer-readable storage media, such as RAM, ROM, EEPROM, EPROM, one or more memory devices, flash memory devices, data registers, etc., and combinations thereof.

The memory 624 can store information that can be accessed by the one or more processors 622. For instance, the memory 624 (e.g., one or more tangible, non-transitory computer-readable storage media, one or more memory devices, etc.) can include computer-readable instructions 626 that can be executed by the one or more processors 622. The instructions 626 can be software written in any suitable programming language or can be implemented in hardware. Additionally, or alternatively, the instructions 626 can be executed in logically and/or virtually separate threads on processor(s) 622.

For example, the memory 624 can store instructions 626 that when executed by the one or more processors 622 cause the one or more processors 622 to perform operations such as any of the operations and functions of the operations computing system 104, the remote computing system 106, the remote computing system 620 and/or computing device(s) 621 or for which any of these computing systems are configured, as described herein, and/or any other operations and functions described herein.

The memory 624 can store data 628 that can be obtained and/or stored. The data 628 can include, for instance, services data (e.g., trip data, route data, user data etc.), data associated with autonomous vehicles (e.g., vehicle data, maintenance data, ownership data, sensor data, map data, perception data, prediction data, motion planning data, object states and/or state data, object motion trajectories, feedback data, fault data, log data, etc.), third-party entity data, inventory data, scheduling data, log data, attribute data, scenario data, training data, and/or other data/information as described herein. In some implementations, the computing device(s) 621 can obtain data from one or more memories that are remote from the remote computing system 620.

The computing device(s) 621 can also include a communication interface 630 used to communicate with one or more other system(s) (e.g., the vehicle computing system 112, etc.). The communication interface 630 can include any circuits, components, software, etc. for communicating via one or more networks (e.g., network(s) 640). In some implementations, the communication interface 630 can include, for example, one or more of a communications controller, receiver, transceiver, transmitter, port, conductors, software, and/or hardware for communicating data.

The network(s) 640 can be any type of network or combination of networks that allows for communication between devices. In some embodiments, the network(s) 640 can include one or more of a local area network, wide area network, the Internet, secure network, cellular network, mesh network, peer-to-peer communication link, and/or some combination thereof, and can include any number of wired or wireless links. Communication over the network(s) 640 can be accomplished, for instance, via a communication interface using any type of protocol, protection scheme, encoding, format, packaging, etc.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method, comprising:
   determining, by a computing system comprising one or more computing devices, a first level of communications traffic, wherein the first level of communications traffic is indicative of an amount of actual communications traffic occurring via a vehicle integration platform, wherein the vehicle integration platform comprises a plurality of application programming interfaces configured to facilitate message communication among clients;
   determining, by the computing system, a predetermined minimum level of desired communications traffic occurring via the vehicle integration platform, wherein the predetermined minimum level of desired communications traffic is representative of a level at which performance measures of the vehicle integration platform are evaluated;
   generating, by the computing system, a second level of communications traffic, wherein the second level of communications traffic comprises an amount of simulated communications traffic determined such that the second level of communications traffic plus the first level of communications traffic is greater than or equal to the predetermined minimum level of desired communications traffic occurring via the vehicle integration platform, wherein the simulation communications traffic is generated based on historical actual communication; and
   monitoring, by the computing system, one or more performance characteristics of the vehicle integration platform while at least the second level of communications traffic is occurring via the vehicle integration platform.

2. The computer-implemented method of claim 1, further comprising:
   generating, by the computing system, an alert when the one or more performance characteristics of the vehicle integration platform satisfies one or more predetermined conditions; and
   relaying, by the computing system, the alert to one of the clients of the vehicle integration platform.

3. The computer-implemented method of claim 1, wherein the first level of communications traffic and the second level of communications traffic are indistinguishable by the vehicle integration platform.

4. The computer-implemented method of claim 1, wherein the clients comprise at least one third-party client associated with a fleet of autonomous vehicles and at least one first-party client associated with a service provider entity.

5. The computer-implemented method of claim 1, wherein:
   the one or more performance characteristics of the vehicle integration platform comprises at least one latency value determined for a request communicated by one of the clients through the vehicle integration platform between first and second communication nodes thereof; and the method further comprises publishing, by the computing system, the at least one latency value to a source accessible by one or more of the clients of the vehicle integration platform.

6. The computer-implemented method of claim 5, further comprising generating, by the computing system, an alert when the at least one latency value exceeds a predetermined threshold level.

7. The computer-implemented method of claim 1, wherein the one or more performance characteristics of the vehicle integration platform comprise a transmission performance rating associated with one or more of a request provided to the vehicle integration platform and a response received from the vehicle integration platform.

8. The computer-implemented method of claim 1, further comprising publishing, by the computing system, the amount of simulated communications traffic corresponding to the second level of communications traffic on a periodic basis to a source accessible by one or more of the clients of the vehicle integration platform.

9. The computer-implemented method of claim 1, wherein the steps of determining a first level of communications traffic and generating a second level of communications traffic are implemented periodically to dynamically ensure over different increments of time that the second level of communications traffic plus the first level of communications traffic is greater than or equal to the predetermined minimum level of desired communications traffic occurring via the vehicle integration platform.

10. A computing system, comprising:
one or more processors; and
one or more memories including instructions that, when executed by the one or more processors, cause the one or more processors to perform operations, the operations comprising:
determining a first level of communications traffic, wherein the first level of communications traffic is indicative of an amount of actual communications traffic occurring via a vehicle integration platform, wherein the vehicle integration platform comprises a plurality of application programming interfaces configured to facilitate message communication among clients;
determining a predetermined minimum level of desired communications traffic occurring via the vehicle integration platform, wherein the predetermined minimum level of desired communications traffic is representative of a level at which performance measures of the vehicle integration platform are evaluated;
generating a second level of communications traffic, wherein the second level of communications traffic comprises an amount of simulated communications traffic determined such that the second level of communications traffic plus the first level of communications traffic is greater than or equal to the predetermined minimum level of desired communications traffic occurring via the vehicle integration platform, wherein the simulation communications traffic is generated based on historical actual communication; and
monitoring one or more performance characteristics of the vehicle integration platform while at least the second level of communications traffic is occurring via the vehicle integration platform.

11. The computing system of claim 10, wherein the operations further comprise:
generating an alert when the one or more performance characteristics of the vehicle integration platform satisfies one or more predetermined conditions; and
relaying the alert to one of the clients of the vehicle integration platform.

12. The computing system of claim 10, wherein the first level of communications traffic and the second level of communications traffic are indistinguishable by the vehicle integration platform.

13. The computing system of claim 10, wherein the clients comprise at least one third-party client associated with a fleet of autonomous vehicles and at least one first-party client associated with a service provider entity.

14. The computing system of claim 10, wherein:
the one or more performance characteristics of the vehicle integration platform comprises at least one latency value determined for a request communicated by one of the clients through the vehicle integration platform between first and second communication nodes thereof; and
the operations further comprise: publishing the at least one latency value to a source accessible by one or more of the clients of the vehicle integration platform.

15. The computing system of claim 14, wherein the operations further comprise: generating an alert when the at least one latency value exceeds a predetermined threshold level.

16. The computing system of claim 10, wherein the one or more performance characteristics of the vehicle integration platform comprise a transmission performance rating associated with one or more of a request provided to the vehicle integration platform and a response received from the vehicle integration platform.

17. The computing system of claim 10, wherein the operations of determining the first level of communications traffic and generating the second level of communications traffic are implemented periodically to dynamically ensure over different increments of time that the second level of communications traffic plus the first level of communications traffic is greater than or equal to the predetermined minimum level of desired communications traffic occurring via the vehicle integration platform.

18. A communication infrastructure, comprising:
a vehicle integration platform comprising a plurality of application programming interfaces configured to facilitate message communication among clients, the clients comprising at least one third-party client associated with a fleet of autonomous vehicles and at least one first-party client associated with a service provider entity; and
a monitoring system configured to:
determine a first level of communications traffic, wherein the first level of communications traffic is indicative of an amount of actual communications traffic occurring via a vehicle integration platform;
determine a predetermined minimum level of desired communications traffic occurring via the vehicle integration platform, wherein the predetermined minimum level of desired communications traffic is representative of a level at which performance measures of the vehicle integration platform are evaluated;
generate a second level of communications traffic, wherein the second level of communications traffic comprises an amount of simulated communications traffic determined such that the second level of communications traffic plus the first level of communications traffic is greater than or equal to the predetermined minimum level of desired communications traffic occurring via the vehicle integration platform, wherein the simulation communications traffic is generated based on historical actual communication; and monitor one or more performance characteristics of the vehicle integration platform while at least the second level of communications traffic is occurring via the vehicle integration platform.

19. The communication infrastructure of claim 18, wherein the monitoring system is configured to publish one or more of the amount of simulated communications traffic corresponding to the second level of communications traffic and the one or more performance characteristics to a source accessible by one or more of the clients of the vehicle integration platform.

20. The communication infrastructure of claim 18, wherein:

the one or more performance characteristics of the vehicle integration platform comprises at least one latency value determined for a request communicated by one of the clients through the vehicle integration platform between first and second communication nodes thereof; and the monitoring system is configured to generate an alert when the at least one latency value exceeds a predetermined threshold level.

* * * * *